3,840,518
DIHYDROINDOLYL-, PYRIMIDONYL-, BENZO-
THIAZOLYL-, DIHYDROQUINOXALYL- OR
DIHYDROQUINAZOLYLMETHYLENE AZO DI-
PHENYLENE OXIDE OR CARBAZOLE DYE-
STUFFS
Ernst Schmitt, Cologne, and Roderich Raue, Leverkusen,
Germany, assignors to Bayer Aktiengesellschaft
No Drawing. Filed Aug. 6, 1971, Ser. No. 169,831
Claims priority, application Germany, Aug. 8, 1970,
P 20 39 492.7
Int. Cl. C09b 29/36; D06p 3/24, 3/70
U.S. Cl. 260—164        16 Claims

ABSTRACT OF THE DISCLOSURE

Hydrazone dyestuff of the formula

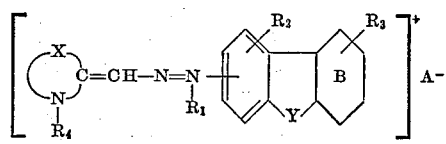

in which B is a 6-membered ring; X is the residue of a 5- or 6-membered heterocyclic ring; Y is O, S, or N; R, $R_1$, $R_2$, $R_3$, and $R_4$ are organic substituents as defined in the application; and A is an anion; these dyestuffs being suitable for dyeing various polyacrylonitrile fibers with good fastness to light, wet processing, rubbing, and sublimation; and also suitable for dyeing and printing leather, cotton, cellulose, super polyamides, and super polyurethanes; and for use in inks. These dyestuffs give acrylonitrile containing materials dyeings characterized by high affinity to the material and by very good fastness to light, wet processing, rubbing and sublimation.

The subject-matter of the invention comprises hydrazone dyestuffs of the formula

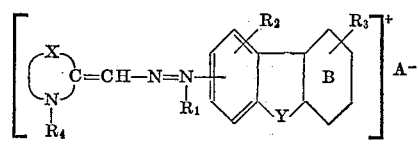 (I)

in which the ring B represents a benzene ring or a 6-membered ring which is partially or completely saturated and with which further rings may be fused;
X stands for the residual members of a 5- or 6-membered heterocyclic ring;
Y stands for O or S or for

where R represents hydrogen, lower alkyl, aralkyl or aryl;
$R_1$ stands for lower alkyl, lower alkenyl or aralkyl;
$R_2$ stands for hydrogen, fluorine, chlorine, bromine, lower alkoxy, lower alkyl, hydroxy, dialkylamino with identical or different lower alkyl radicals, or for lower alkyl-acylamino;
$R_3$ stands for hydrogen, chlorine, bromine, lower alkyl, lower alkoxy, hydroxy, dialkylamino with identical or different alkyl radicals or for lower alkyl-acyl-amino when the ring B represents a benzene ring; or for hydrogen, chlorine or lower alkyl when the ring B represents a partially or completely saturated 6-membered ring;
$R_4$ stands for lower alkyl, cycloalkyl, aralkyl or aryl; and
$A^-$ stands for an anion.

The subject matter of the invention further comprises processes for the production of these dyestuffs; their use for dyeing and printing; and the materials which have been dyed or printed with the said dyestuffs.

Lower alkyl is, for example, methyl, ethyl, n-propyl, iso-propyl, n-butyl, 2-chloroethyl and 3-chloropropyl.

Lower alkoxy stands, for example, for methoxy, ethoxy, n-propoxy, iso-propoxy and n-butoxy.

Suitable dialkylamino radicals are, for example, di-methylamino, diethylamino and di-n-propylamino.

Acylamino stands, for example, for formylamino, acetylamino, propionylamino and n-butyrylamino.

Suitable cycloalkyl radicals are, for example, the cyclohexyl and 4-methyl-cyclohexyl radicals; suitable aralkyl radicals are benzyl, β-phenylethyl, γ-phenylpropyl, phenylpropyl-(2,2) and 4-nitrobenzyl; suitable aryl radicals are phenyl and its derivatives substituted by lower alkyl and/or by halogen such as chlorine and bromine, e.g. 2- and 4-chlorophenyl and 2- and 4-methylphenyl.

Suitable anionic radicals $A^-$ are the organic and inorganic anions usual in basic dyestuffs; examples are chloride, bromide, $CH_3SO_4^-$, $C_2H_5SO_4^-$, p-toluene-sulphonate, $HSO_4^-$, $SO_4^{--}$, benzene-sulphonate, p-chlorobenzene-sulphonate, dihydrogen phosphate, phosphate, acetate, chloroacetate, formate, propionate, lactate, crotonate, $NO_3^-$, perchlorate, $ZnCl_3^-$, and the anions of saturated or unsaturated aliphatic dicarboxylic acids such as malonic acid, maleic acid, citric acid, oxalic acid, itaconic acid, succinic acid, glutaric acid, adipic acid, pimelic acid and suberic acid. Colourless anions are preferred; for dyeing from an aqueous medium those anions are preferred which do not too strongly impair the water-solubility of the dyestuff. For dyeing from organic solvents those anions are frequently preferred which further the solubility of the dyestuff in organic solvents or, at least, do not adversely affect it, for example, tetrapropylene-benzene-sulphonate, n-dodecylbenzene-sulphonate or the anion of n-tetradecane-carboxylic acid and that of ethylhexyl-carboxylic acid.

Preferred groups among the dyestuffs according to the invention are those of the general formula

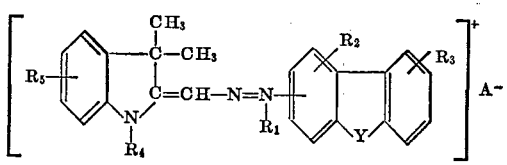

in which

Y stands for O or S or for

where R represents lower alkyl, aralkyl or aryl;
$R_1$ stands for lower alkyl, lower alkenyl or aralkyl;
$R_2$ stands for hydrogen, fluorine, chlorine, bromine, lower alkoxy, lower alkyl, hydroxy, dialkylamino with identical or different alkyl radicals or for lower alkyl-acyl-amino;
$R_3$ stands for hydrogen, chlorine, bromine, lower alkyl, lower alkoxy, hydroxy, dialkylamino with identical or different lower alkyl radicals or for lower alkyl-acyl-amino;
$R_4$ stands for lower alkyl, cycloalkyl, aryl or aralkyl;
$R_5$ stands for hydrogen, fluorine, chlorine, lower alkyl, fluoroalkyl, lower alkoxy, lower carboalkoxy, nitro, cyano or acetamino; and
$A^-$ stands for an anion, and those of the general formula

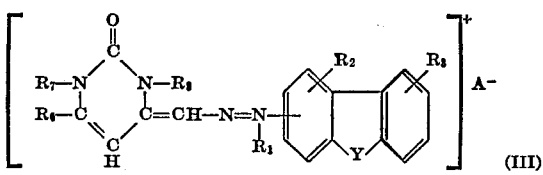

(III)

in which

Y stands for O or S or for

where R represents lower alkyl, aralkyl or aryl;
$R_1$ stands for lower alkyl, lower alkenyl or aralkyl;
$R_2$ stands for hydrogen, fluorine, chlorine, bromine, lower alkoxy, lower alkyl, hydroxy, dialkylamino with identical or different lower alkyl radicals or for lower alkyl-acylamino;
$R_3$ stands for hydrogen, chlorine, bromine, lower alkyl, lower alkoxy, hydroxy, dialkylamino with identical or different lower alkyl radicals or for lower alkyl-acylamino;
$R_6$ stands for hydrogen or lower alkyl;
$R_7$ stands for lower alkyl;
$R_8$ stands for lower alkyl; and
$A^-$ stands for an anion.

Lower carboalkoxy radicals according to the invention are, for example, carbomethoxy, carboethoxy, carbo-$n$-propoxy and carbo-iso-propoxy.

Particularly suitable dyestuffs within the scope of the formula (II) are those in which Y stands for

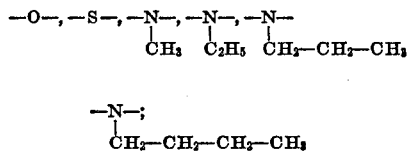

$R_1$ stands for methyl or ethyl;
$R_2$ stands for hydrogen, chlorine, methyl or methoxy;
$R_3$ stands for hydrogen, methyl, methoxy or ethoxy;
$R_4$ stands for methyl or ethyl; and
$R_5$ stands for hydrogen, chlorine, methyl, ethyl, trifluoromethyl, cyano, nitro, methoxy, carbomethoxy or carboethoxy, and those dyestuffs of the formula (III) in which Y stands for
or

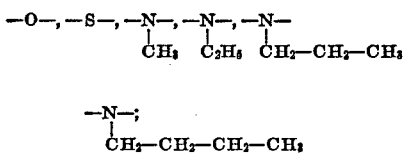

$R_1$ stands for methyl or ethyl;
$R_2$ stands for hydrogen, chlorine, methyl or methoxy;
$R_3$ stands for hydrogen, methyl, methoxy or ethoxy;
$R_6$ stands for methyl, ethyl or phenyl;
$R_7$ stands for methyl or ethyl; and
$R_8$ stands for methyl or ethyl.

If dyestuffs of particularly good solubility in water are desired, those dyestuffs according to the invention are preferred in which the anion $A^-$ is the acetate or lactate anion or an anion of an aliphatic dicarboxylic acid, such as succinic acid, glutaric acid, adipic acid, pimelic acid or suberic acid, maleic acid or itaconic acid.

The hydrazone dyestuffs according to the invention can be prepared by alkylating in known manner azo bases of the formula

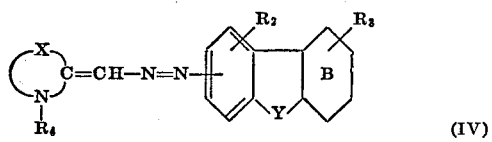

(IV)

in which the ring B represents a benzene ring or a 6-membered ring which is partially or completely saturated;
X stands for the residual members of a 5- or 6-membered heterocyclic ring with which further rings may be fused;
Y stands for O or S or for

N
|
R where R represents lower alkyl, aralkyl or aryl;
$R_2$ stands for hydrogen, fluorine, chlorine, bromine, lower alkoxy, lower alkyl, hydroxy, dialkylamino with identical or different lower alkyl radicals or for lower alkyl-acylamino;
$R_3$, when the ring B represents a benzene ring, stands for hydrogen, chlorine, bromine, lower alkyl, lower alkoxy, hydroxy, dialkylamino with identical or different lower alkyl radicals or for lower alkyl-acylamino; or when the ring B represents a partially or completely saturated 6-membered ring, stands for hydrogen, chlorine or lower alkyl;
$R_4$ stands for lower alkyl, cycloalkyl, aralkyl or aryl; and
$A^-$ stands for an anion.

The term "alkylation" in the meaning of the invention refers to the introduction of an alkyl, alkenyl or aralkyl radicals.

Dyestuffs of the formulae (II) and (III) can be prepared in an analogous manner from the corresponding starting compounds.

Azo bases of the formula (IV) can be prepared by diazotising in known manner amines of the formula

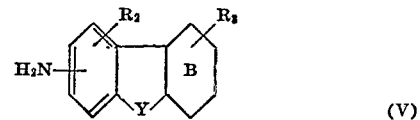

(V)

in which the ring B and the radicals Y, $R_2$ and $R_3$ have the same meaning as above, and coupling with compounds of the formulae

(VI)

or their salts
or

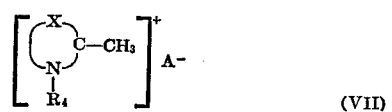

(VII)

in which X and $R_4$ have the same meaning as above and $A^-$ stands for an anion.

An exchange of dyestuff anions for other dyestuff anions can be carried out by treating the basic dyestuff with acid-binding agents such as sodium carbonate, potassium carbonate, ammonium carbonate, magnesium carbonate, sodium hydroxide, potassium hydroxide, ammonia and silver oxide, optionally in an aqueous medium, to form the dyestuff onium base (or the carbinol base) and treating the latter with anion-yielding agents, these anions being different from those of the basic dyestuff used. The preferred anions which can be introduced in this way are the formate, acetate, malonate, maleinate, succinate, adipate and lactate.

Amino components of the formula (V) are, for example:

2-aminocarbazole,
3-aminocarbazole,
2-amino-9-methylcarbazole,
3-amino-9-methylcarbazole,
3-amino-9-ethylcarbazole,
3-amino-9-n-propylcarbazole,
3-amino-9-n-butyl-carbazole,
3-amino-9-(p-aminophenyl)-carbazole,
3-amino-6-chlorocarbazole,
1-amino-9-methyl-3,6-dibromocarbazole,
2-amino-1-methoxydiphenylene sulphide,
3-amino-diphenylene sulphide,
3-amino-2-bromodiphenylene sulphide,
3-amino-1-ethoxy-6-methyldiphenylene sulphide,
3-amino-1-bromo-6-methyldiphenylene sulphide,
3-amino-6-ethoxydiphenylene sulphide,
4-aminodiphenylene sulphide,
1-aminodiphenylene sulphide,
3-amino-6-acetamino-diphenylene oxide,
6-amino-3-bromo-diphenylene oxide,
7-amino-3-chloro-diphenylene oxide,
3-amino-7-chloro-diphenylene oxide,
2-amino-6-chloro-diphenylene oxide,
2-amino-6-bromo-diphenylene oxide,
2-aminodiphenylene oxide,
3-aminodiphenylene oxide,
3-amino-2-methyldiphenylene oxide,
3-amino-2-ethyldiphenylene oxide,
2-amino-3-methoxydiphenylene oxide,
2-amino-3-ethoxydiphenylene oxide,
7-amino-1,2,3,4-tetrahydrodiphenylene oxide,
8-amino-1,2,3,4,10,11-hexahydrodiphenylene oxide,
6-amino-9-methyl-1,2,3,4-tetrahydrocarbazole,
6-amino-3-methyl-1,2,3,4-tetrahydrocarbazole,
7-amino-3-methyl-1,2,3,4-tetrahydrocarbazole,
5-amino-8-chloro-1,2,3,4-tetrahydrocarbazole,
7-amino-6-ethoxy-1,2,3,4-tetrahydrocarbazole,
7-amino-9-ethyl-1,2,3,4-tetrahydrocarbazole,
6-amino-9-ethyl-1,2,3,4-tetrahydrocarbazole,
7-amino-8-chloro-1,2,3,4,10,11-hexahydrocarbazole.

Suitable coupling components of the formula (VI) are, for example:

1,3,3-trimethyl-2-methylene-2,3-dihydroindole,
1,3,3,5-tetramethyl-2-methylene-2,3-dihydroindole,
1,3,3-trimethyl-5-chloro-2-methylene-2,3-dihydroindole,
1,3,3-trimethyl-5-fluoro-2-methylene-2,3-dihydroindole,
1,7-dimethyl-5-chloro-2-methylene-benzothiazoline,
1,3,3-trimethyl-5-methoxy-2-methylene-2,3-dihydroindole,
1,3,3-trimethyl-5-carbomethoxy-2-methylene-2,3-dihydroindole,
1,3,3-trimethyl-5-cyano-2-methylene-2,3-dihydroindole,
1,3,3-trimethyl-5-nitro-2-methylene-2,3-dihydroindole,
1,3,3-trimethyl-6-chloro-2-methylene-2,3-dihydroindole,
1,3,3-trimethyl-7-methyl-2-methylene-2,3-dihydroindole,
1,3,3-trimethyl-7-chloro-2-methylene-2,3-dihydroindole,
1,3,3-trimethyl-5-trifluoromethyl-2-methylene-2,3-dihydroindole,
1,3,3-trimethyl-7-methoxy-2-methylene-2,3-dihydroindole,
1,3,3-trimethyl-7-chloro-2-methylene-2,3-dihydroindole,
1-ethyl-3,3-dimethyl-2-methylene-2,3-dihydroindole,
1-ethyl-3,3,5-trimethyl-2-methylene-2,3-dihydroindole,
1-ethyl-3,3-dimethyl-5-chloro-2-methylene-2,3-dihydroindole,
1-ethyl-3,3-dimethyl-5-methoxy-2-methylene-2,3-dihydroindole,
1-ethyl-3,3-dimethyl-5-carbomethoxy-2-methylene-2,3-dihydroindole,
1-ethyl-3,3-dimethyl-5-carboethoxy-2-methylene-2,3-dihydroindole,
1-ethyl-3,3-dimethyl-5-nitro-2-methylene-2,3-dihydroindole,
1,3,3-triethyl-2-methylene-2,3-dihydroindole,
1-phenyl-3,3-dimethyl-2-methylene-2,3-dihydroindole,
1,3,6-trimethyl-4-methylene-pyrimidone-(2) (formula VIII),
1,3-dimethyl-4-methylene-dihydropyrimidone-(2),
1,3,6-trimethyl-4-methylene-dihydropyrimidone-(2),
1-methyl-3-ethyl-4-methylene-dihydropyrimidone-(2),
1,3-diethyl-4-methylene-dihydropyrimidone-(2),
1,3-dimethyl-6-phenyl-4-methylene-dihydropyrimidone-(2),
1,3-diethyl-6-phenyl-4-methylene-dihydropyrimidone-(2),
1-methyl-2-methylene-benzothiazoline,
1,7-dimethyl-5-chloro-2-methylene-benzothiazoline,
1,3-dimethyl-2-methylene-dihydro-(1,2)-quinoxaline (formula IX),
1-phenyl-3-methyl-2-methylene-dihydro-(1,2)-quinoxaline,
1,4-dimethyl-2-methylene-dihydro-(1,2)-quinoxalone-(3) (formula X),
1-methyl-4-n-propyl-2-methylene-dihydro-(1,2)-quinoxalone-(3),
3-methyl-4-methylene-dihydro-(3,4)-quinazolone-(2) (formula XI),
1,3-dimethyl-4-methylene-dihydro-(3,4)-quinazolone-(2) and
1,3-dimethyl-6-methoxy- or -6-ethoxy-4-methylene-dihydro-(3,4)-quinazolone-(2);

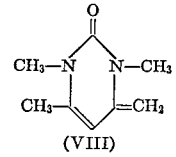
(VIII)

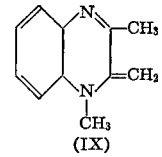
(IX)

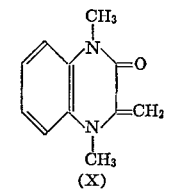
(X)

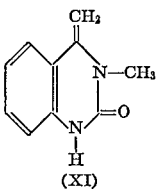
(XI)

Suitable compounds of the formula (VII) are, for example the salts of the compounds (VI) mentioned above with hydrochloric acid, hydrobromic acid, sulphuric acid, methyl-sulphuric acid, ethyl-sulphuric acid, benzene- and p-toluene-sulphonic acid and acetic acid, 2,3-dimethyl-benzothiazolium methylsulphate, 2,3-dimethyl-6-methoxy-benzothiazolium chloride, 1,4-dimethyl-quinolinium methyl-sulphate, and 1,2-dimethyl-isoquinolinium methylsulphate.

The alkylation can be carried out by heating a solution or suspension of a compound (IV) in an inert medium with the alkylating agent to 60–150° C., preferably 70–120° C. The alkylating agent can also be used in excess as solvent.

Suitable inert media are, for example, organic liquids such as benzine, ligroin, cyclohexane, benzene, toluene, chlorobenzene and dichlorobenzene, nitrobenzene, tetralin, dioxan and dimethyl formamide.

Suitable alkylating agents, alkenylating agents and aralkylating agents are, for example, dimethyl sulphate, diethyl sulphate, di-n-butyl sulphate, di-iso-amyl sulphate, dimethyl pyrosulphate; benzene-sulphonic acid methyl, ethyl, n-propyl, isopropyl and isobutyl ester; p-toluene-sulphonic acid methyl, ethyl, n-propyl, isopropyl, and isobutyl ester; methyl iodide, ethyl iodide, n-butyl bromide, allyl bromide; 2-chloro- and 2-bromo-diethyl ether; chloro- and bromoacetic acid ethyl ester; benzyl chloride, benzyl bromide, 4-nitrobenzyl chloride and 4-nitro-benzyl bromide.

The alkylation can also be carried out in the presence of alkaline agents, especially in the presence of tertiary amines which carry space-filling substituents on the nitrogen atom, according to Belgian Patent Specification No.

735,565. Triiso-propanolamine is a particularly suitable amine with space-filling substituents.

The compounds of the general formulae (I), (II) and (III) are valuable dyestuffs which are particularly suitable for dyeing loose material, fibres, filaments, ribbons, fabrics or knitted fabrics consisting of polyacrylonitrile or of copolymers of acrylonitrile with other vinyl compounds such as vinyl chloride, vinylidene chloride, vinyl fluoride, vinyl acetate, vinyl-pyridine, vinyl-imidazole, vinyl alcohol, acrylic and methacrylic acid esters and amides, as dicyanoethylene; or for dyeing loose material, fibres, filaments, ribbons, fabrics or knitted fabrics of acid-modified aromatic polyesters. Acid-modified aromatic polyesters are, for example, polycondensation products of sulphoterephthalic acid and ethylene glycol, i.e. polyethylene glycol terephthalates containing sulphonic acid groups (type Dacron 64® of E. I. du Pont de Nemours and Company), such as are described in Belgian Patent Specification No. 549,179 and U.S. Patent Specification No. 2,893,816. The dyestuffs are further suitable for the dyeing of acid-modified polyamide.

Dyeing can be carried out from a weakly acidic bath; it is expedient to introduce the material into the dyebath at 40–60° C. and then to dye at boiling temperature. Furthermore, the dyestuffs can be added to spinning solutions for the production of fibres containing polyacrylonitrile or they can be applied to the unstretched fibre.

The dyeings on material containing acrylonitrile are characterised by very good fastness to light, wet processing, rubbing and sublimation and by a high affinity to the fibre.

The dyestuffs are further suitable for dyeing and printing materials of leather, tanned cotton, cellulose, synthetic superpolyamides and superpolyurethanes, as well as for dyeing lignin-containing fibres such as coconut, jute and sisal. They are also suitable for the production of writing liquids, stamping inks, pastes for ball point pens and they can be used in offset printing.

With anionic precipitating agents, such as alumina, tannin, phosphotungstic (molybdic) acids, the dyestuffs form pigments which can be used with advantage in paper printing.

The degrees of temperature in the examples stand for degrees centigrade.

EXAMPLE 1

36.6 g. of 3-aminodiphenylene oxide are added to a mixture of 62 ml. of 30% aqueous hydrochloric acid and 800 ml. of water. The mixture is stirred at 60° for 1 hour, then cooled to 0° while stirring, and diazotised at 0–3° with 65 ml. of a 30% sodium nitrite solution. Stirring is continued for 30 minutes with a slight excess of nitrite, the excess of nitrite is then destroyed by the addition of amidosulphonic acid, and the diazonium salt solution so obtained is filtered. While stirring at 3–5° C., there are added dropwise first 1,3,3-trimethyl-2-methylene-2,3-dihydroindole within 15 minutes, then 300 ml. of a 20% sodium acetate solution within 3 hours while cooling. The mixture is then allowed to warm up to 10–15° and 200 ml. of a 10% sodium hydroxide solution are added within 1 hour. The mixture is stirred at 40° for 12 hours, adjusted to pH 9–10 by the addition of 10 to 40 ml. of a 10% sodium hydroxide solution, and further stirred for 2 hours. The precipitated coupling product (azo base) is filtered off with suction, washed with water until neutral, and dried at 60° under reduced pressure.

Yield: 52 g., recrystallised from alcohol.

M.p. 158–159° C. (uncorr.).

For alkylation, 29.3 g. of the azo base are dissolved in 250 ml. chlorobenzene with the addition of 2.0 g. triisopropanolamine. 50 ml. chlorobenzene are distilled off at 80–85° C. under reduced pressure, 15.5 g. dimethyl sulphate are then added dropwise at 80°, stirring is continued at the same temperature for 10 hours, 30 ml. of water are then added, and stirring is continued at 80° for 2 hours. The chlorobenzene is removed by steam distillation and the precipitated red dyestuff is purified by recrystallisation from water with the addition of charcoal.

Yield: 31.0 g.

The resultant dyestuff of the formula

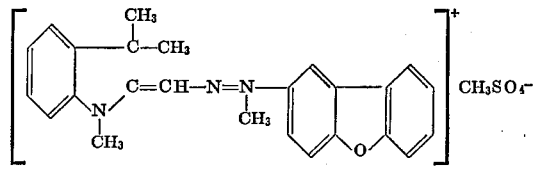

dyes materials of polyacrylonitrile in yellowish red shades of good fastness to light and wet processing.

EXAMPLE 2

28.9 g. of azo base are obtained in analogy with Example 1 from 21 g. 3-aminodiphenylene oxide and 19.5 g. 1,3,3 - trimethyl - 5 - methoxy-2-methylene-2,3-dihydroindole.

Alkylation of 7.94 g. of the azo base with 6.0 g. dimethyl sulphate, carried out in analogy with Example 1, yields 7.0 g. of a methylated red dyestuff which is purified by recrystallisation from water with the addition of charcoal.

The resultant dyestuff of the formula dyes materials of polyacrylonitrile in yellowish red shades of good fastness to light and wet processing.

EXAMPLE 3

12 g. of azo base are obtained in analogy with Example 1 from 21.3 g. 2-amino-3-methoxy-diphenylene oxide and 17.3 g. 1,3,3-trimethyl-2-methylene-2,3-dihydroindole.

Alkylation of 10 g. of the azo base with 4.8 g. diethyl sulphate, carried out in analogy with Example 1, yields 10.6 g. of a red ethylated dyestuff which is recrystallised from water with the addition of charcoal.

The resultant dyestuff of the formula dyes polyacrylonitrile in yellowish red shades of good fastness to light and wet processing.

EXAMPLE 4

80 g. of azo base are obtained in analogy with Example 1 from 36.6 g. 3-aminodiphenylene oxide and 46.2 g. 1,3,3-trimethyl-5-carbomethoxy-2,3-dihydroindole dissolved in 50 ml. ethanol. M.p. 219° (uncorr.), after recrystallisation from alcohol with the addition of dimethyl formamide.

Alkylation of 7.0 g. of the azo base with 4.0 g. dimethyl sulphate, carried out in analogy with Example 1, yields, after recrystallisation from alcohol, 5.5 g. of a red dyestuff which corresponds to the formula

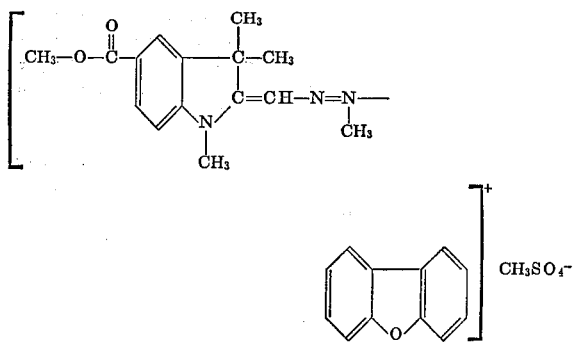

and dyes materials of polyacrylonitrile in red shades of outstanding fastness properties.

EXAMPLE 5

31.5 g. 3-amino-9-ethyl-carbazole are added to a mixture of 48 ml. of 30% aqueous hydrochloric acid and 600 ml. of water, and the mixture is stirred at 60° for 1 hour. The mixture is cooled to 0° C. while stirring and diazotised at 0–3° C. with 55 ml. of a 30% sodium nitrite solution. Stirring is continued for 30 minutes, and the excess of nitrite is then destroyed by the addition of amidosulphonic acid. 32.7 g. 1,3,3-trimethyl-5-nitro-2-methylene-2,3-dihydroindole dissolved in 150 ml. of 5% aqueous hydrochloric acid are added dropwise to the filtered diazonium salt solution at 3–5° C. within 15 minutes while stirring. 400 ml. of a 20% soduim acetate solution are subsequently added dropwise within 3 hours while cooling. When a temperature of 10–15° C. has been reached, the pH is adjusted to 9 within 1 hour by the addition of a 10% sodium hydroxide solution, the mixture is stirred at 40° for 12 hours, the pH is adjusted to 9–10 by the addition of a further 15–30 ml. of a 10% sodium hydroxide solution, and stirring is continued for 2 hours. The precipitated azo base is washed with water until neutral and dried at 60° under reduced pressure.

Yield 47.5 g.; m.p. 159–163° (uncorr.).

For alkylation, 18 g. of the azo base are dissolved in 150 ml. chlorobenzene with the addition of 1 g. triisopropanolamine. 30 ml. chlorobenzene are distilled off at 80–85° C. under reduced pressure, 8.2 g. dimethyl sulphate are added dropwise at 80°, and stirring is continued at the same temperature for 10 hours. 20 ml. of water are subsequently added, and stirring is continued at 80° for 2 hours. The chlorobenzene is removed by steam distillation, and the precipitated violet-red dyestuff is purified by recrystallisation from alcohol with the addition of charcoal.

Yield: 19.2 g. of a dyestuff which corresponds to the formula

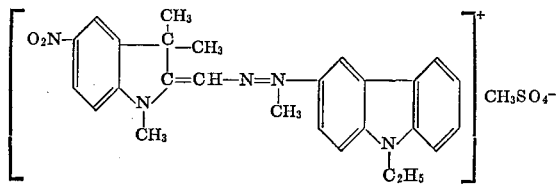

and dyes materials of polyacrylonitrile in violet-red shades of good fastness to light and wet processing.

EXAMPLE 6

34 g. of azo base are obtained, in analogy with Example 5 from 21 g. 3-amino-9-ethyl-carbazole and 17.3 g. 1,3,3-trimethyl-2-methylene-2,3-dihydroindole.

M.p. 173–175° (uncorr.).

Alkylation of 14.2 g. of the azo base with 8.0 g. dimethyl sulphate, carried out in analogy with Example 5, yields, after recrystallisation from water/dimethyl formamide, 6.5 g. of a dyestuff which corresponds to the formula

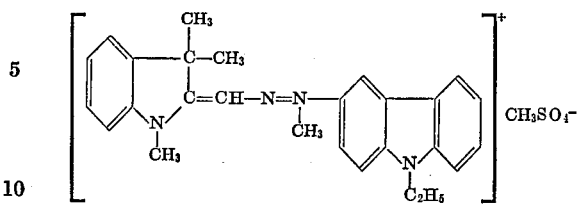

and dyes materials of polyacrylonitrile in red shades of good fastness to light and wet processing.

When 4 g. of the above azo base are alkylated with 2 ml. methyl iodide in 30 ml. chlorobenzene by heating at 60° for two hours, then the dyestuff of the formula

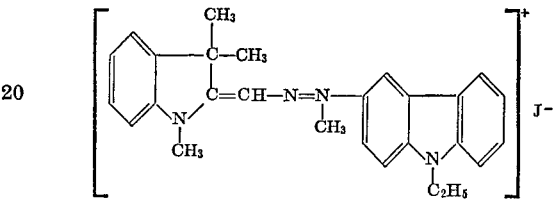

is obtained in a yield of 4.6 g.; it dyes materials of polyacrylonitrile in red shades.

When alkylation is carried out by reacting 4 g. of the above azo base with 2 g. p-toluene-sulphonic acid methyl ester in 30 ml. chlorobenzene at 90–95°, then there is obtained the dyestuff of the formula

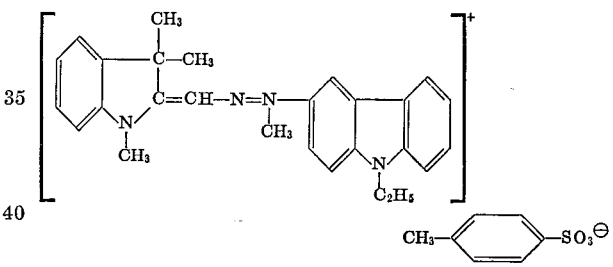

which dyes materials of polyacrylonitrile in red shades.

EXAMPLE 7

The azo base is obtained in analogy with Example 5 from 42 g. 3-amino-9-ethyl-carbazole and 46.2 g. 1,3,3-trimethyl - 5 - carbomethoxy-2-methylene-2,3-dihydroindole. M.p. 219° (uncorr.) after recrystallisation from alcohol/dimethyl formamide.

For methylation, 9.0 g. of azo base are dissolved in 100 ml. chlorobenzene with the addition of 0.5 g. triisopropanolamine, 30 ml. chlorobenzene are then distilled off at 80–85° under reduced pressure, 4.0 g. dimethyl sulphate are subsequently added dropwise at 80° within 10 minutes, and stirring is continued at 80–85° for 5 hours. When the mixture has cooled down, the precipitated dyestuff is filtered off with suction and washed with chlorobenzene and ligroin.

Yield: 9.0 g. of a dyestuff of m.p. 207–208° C. which corresponds to the formula

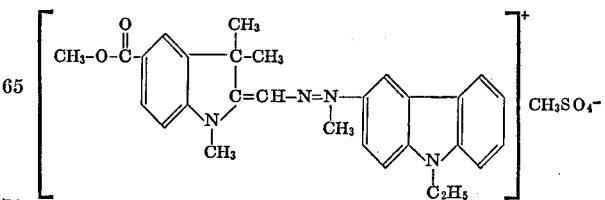

and dyes materials of polyacrylonitrile in red shades of good fastness to light and wet processing.

EXAMPLE 8

17.0 g. of azo base are obtained in analogy with Example 5 from 10.5 g. 3-amino-9-ethyl-carbazole and 9.7 g. 1,3,3 - trimethyl - 5-chloro-2-methylene-2,3-dihydroindole.

Methylation of 8.6 g. of the azo base with 6.7 g. dimethyl sulphate, carried out in analogy with Example 5, yields a dyestuff which corresponds to the formula

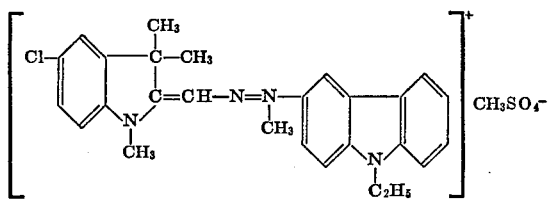

and is obtained in the form of red crystals; it dyes materials of polyacrylonitrile in yellowish red shades of outstanding fastness properties.

EXAMPLE 9

10.5 g. 3-amino-9-ethyl-carbazole are diazotised as described in Example 5 and the diazo compound is coupled with 11.8 g. 1,3-dimethyl-3,4-dihydropyrimidonium-(2)-hydrogensulphate. By the addition of a 10% sodium hydroxide solution the coupling product is converted into the azo base which is thus precipitated, then washed with water until neutral, and dried at 60° under reduced pressure.

Yield: 11.6 g.

For methylation, 4.6 g. of the azo base are dissolved in 75 ml. chlorobenzene with the addition of 0.25 g. triisopropanolamine. After distilling off 40 ml. at 80–85° C., 3.3 g. dimethyl sulphate are added dropwise at 80° C., and stirring is continued at 80° C. for 15 hours. After removal of the chlorobenzene, there are obtained 4.6 g. of a dyestuff which corresponds to the formula

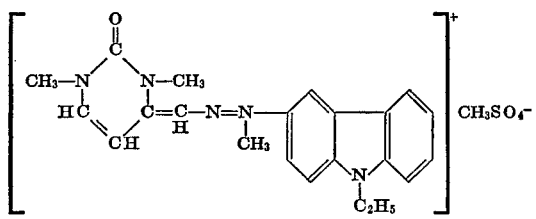

and dyes materials of polyacrylonitrile in bluish red shades of good fastness to light and wet processing.

EXAMPLE 10

42.0 g. of 3-amino-9-ethyl-carbazole are diazotised as described in Example 5, and the diazo compound is coupled with 100 ml. of an aqueous solution of 35.3 g. 1,3,4-trimethyl-3,4-dihydropyrimidonium - (2) - chloride. The coupling product is adjusted to pH 9 with a 10% sodium hydroxide solution, filtered off with suction, washed with water until neutral, and recrystallised from alcohol after drying.

Yield: 31 g.; m.p. 207–208° (uncorr.).

For methylation, 26.1 g. of the azo base are reacted with 13.7 g. dimethyl sulphate in chlorobenzene at 80°, and the precipitated dyestuff is recrystallised from alcohol/water (1:2).

M.p. 256°.

The dyestuff corresponds to the formula

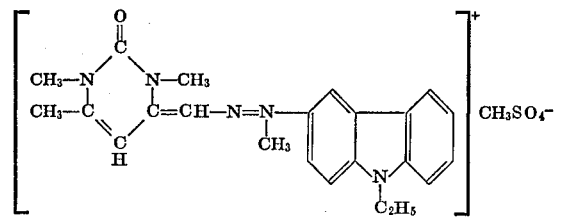

and dyes materials of polyacrylonitrile in red shades of good fastness to light and wet processing.

EXAMPLE 11

10 g. of the dyestuff prepared in Example 10 are dissolved in a mixture of 150 ml. of water and 50 ml. of alcohol, and a solution of 15 g. of anhydrous sodium carbonate in 150 ml. of water is added with stirring. The precipitated brown flaky base is washed with water until neutral and recrystallised from alcohol after drying.

M.p. 210° (uncorr.).

The resultant dark-brown crystalline powder gives with dilute aqueous acetic acid a solution of a dyestuff which corresponds to the formula

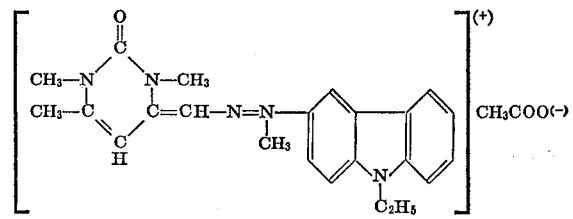

and dyes materials of polyacrylonitrile in red shades; and with a dilute aqueous succinic acid solution it gives a solution of the dyestuff which corresponds to the formula

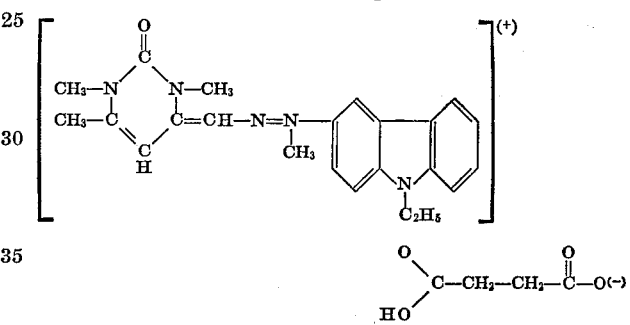

and dyes materials of polyacrylonitrile in red shades.

EXAMPLE 12

36.6 g. of 3-aminodiphenylene oxide are diazotised as described in Example 1, and the diazo compound is coupled with 100 ml. of an aqueous solution of 35.3 g. 1,3, 4 - trimethyl-3,4-dihydropyrimidonium-(2)-chloride. The coupling product is adjusted to pH 9 with a 10% sodium hydroxide solution, stirring is continued at room temperature for 12 minutes, the product is filtered off with suction, washed with water until neutral, dried, and the azo base so obtained is recrystallised from ethanol. Red crystals of melting point 190–192° are obtained.

For methylation, 13.8 g. of the azo base are reacted with 11.5 g. dimethyl sulphate in chlorobenzene and the precipitated dyestuff is recrystallised from water. The dyestuff corresponds to the formula

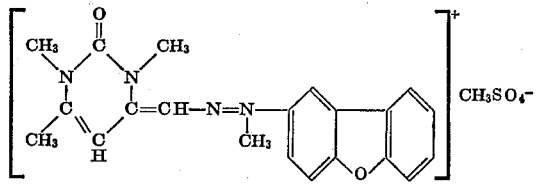

and dyes materials of polyacrylonitrile in red shades of good fastness to light and wet processing.

EXAMPLE 13

21.3 g. 2-amino-3-methoxy-diphenylene oxide are diazotised in a mixture of 31 ml. of concentrated hydrochloric acid and 400 ml. of water with a sodium nitrite solution, and the diazo compound is coupled with 23.6 g. 1,3 - dimethyl-3,4-dihydropyrimidonium-(2)-hydrogensulphate. The coupling product is converted by the addition of a 10% sodium hydroxide solution into the azo base which, after washing with water and drying at 60° in a vacuum, is subsequently recrystallised from alcohol.

Yield: 15.9 g. of orange-red crystals of m.p. 229–230°.

For methylation, 6.5 g. of the azo base are reacted with 4.3 g. dimethyl sulphate at 80° in chlorobenzene. The precipitated dyestuff is recrystallised from water.

The dyestuff corresponds to the formula

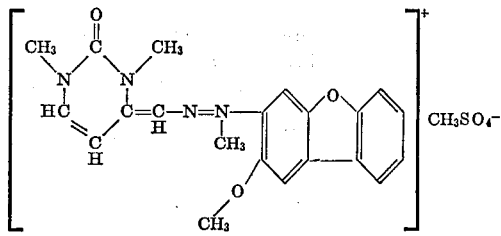

and dyes materials of polyacrylonitrile in red shades of good fastness to light and wet processing.

EXAMPLE 14

11.0 g. 2-amino-diphenylene oxide are diazotised in a mixture of 16 ml. of concentrated aqueous hydrochloric acid and 200 ml. of water with an aqueous sodium nitrite solution, and the diazo compound is coupled with 12 g. 1,3,3-trimethyl-5-trifluoromethyl-2-methylene-2,3-dihydroindole. The coupling products is coverted with a 10% sodium hydroxide solution into the azo base which, after washing with water and drying at 60°, is recrystallised from a mixture of alcohol and dimethyl formamide. 13.0 g. of the orange-red azo base are obtained.

For methylation, 9.15 g. of the azo base are reacted at 80° with 4.6 g. dimethyl sulphate in chlorobenzene. After recrystallisation of the precipitated matter from water/dimethyl formamide, there are obtained 12.6 g. of a dyestuff which corresponds to the formula

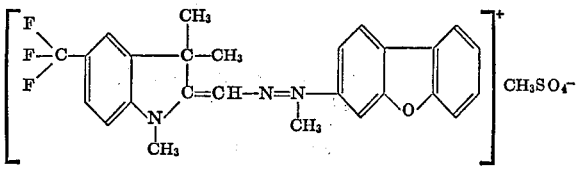

and dyes materials of polyacrylonitrile in yellow shades of good fastness to light and wet processing.

EXAMPLE 15

5.8 g. 3-amino-diphenylene sulphide are diazotised in a mixture of 17 ml. of concentrated aqueous hydrochloric acid and 200 ml. of water at 0° with an aqueous sodium nitrite solution and the diazo compound is coupled with 10.2 g. 1,3,3-trimethyl-2-methylene-2,3 - dihydroindole. The coupling product is converted with a 10% aqueous sodium hydroxide solution into the azo base which, after washing with water, is recrystallised from a mixture of water and dimethyl formamide.

Yield: 7.0 g.; m.p. 158°.

For methylation, 5.7 g. of the azo base are reacted at 80° in chlorobenzene with 4.1 g. dimethyl sulphate. The matter remaining after removal of the solvent is recrystallised from water with the addition of charcoal. 6.3 g. of the dyestuff of the formula

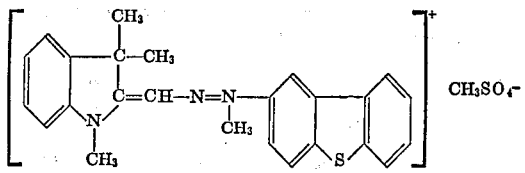

are obtained; it dyes materials of polyacrylonitrile in yellow shades of high fastness to light and wet processing.

EXAMPLE 16

1.4 g. of azo base are obtained in analogy with Example 1 from 0.95 g. 6-amino-1,2,3,4-tetrahydrodiphenylene oxide and 0.9 g. 1,3,3-trimethyl-2-methylene-2,3-dihydroindole. M.p. 118–122°.

Alkylation of 1.4 g. of the azo base with 1.2 g. dimethyl sulphate, carried out in analogy with Example 1, yields 1.2 g. of a methylated dyestuff which is heated in water in the presence of charcoal for purification. After the addition of a 10% sodium chloride solution and ZnCl₂, the dyestuff of the formula

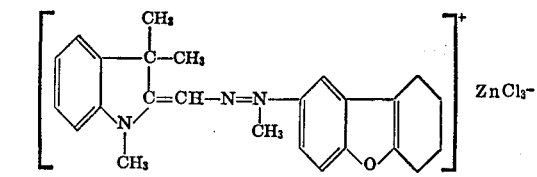

is obtained from the filtrate in the form of red crystals.

EXAMPLE 17

3.1 g. of red-violet azo base are obtained in analogy with Example 1 from 2.3 g. 7-amino-9-methyl-1,2,3,4-tetrahydrocarbazole and 1.8 g. 1,3,3-trimethyl-2-methylene-2,3-dihydroindole.

Alkylation of 3.1 g. of the azo base with 2.6 g. dimethyl sulphate, carried out in analogy with Example 1, yields 3.4 g. of a dyestuff which can be further purified by recrystallisation from water. The resultant dyestuff corresponds to the formula

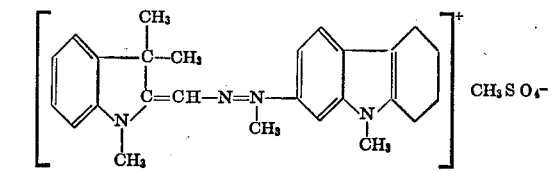

and dyes materials of polyacrylonitrile in scarlet-red shades.

EXAMPLE 18

Polyacrylonitrile fibres are introduced at 40° C. in a liquor ratio of 1:40 into an aqueous bath containing, per litre, 0.75 g. of 30% acetic acid, 0.38 g. sodium acetate and 0.15 g. of the dyestuff of the formula

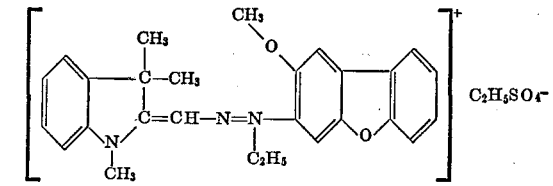

The bath is heated to boiling temperature within 20–30 minutes and kept at the same temperature for 30–60 minutes. After rinsing and drying, there is obtained a yellowish red dyeing of very good fastness properties.

EXAMPLE 19

A fabric of polyacrylonitrile is printed with a printing paste prepared in the following way:

330 parts by weight of hot water are poured over 30 parts of the dyestuff of the formula

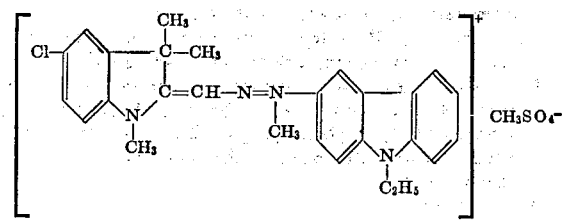

50 parts by weight thiodiethylene glycol
30 parts by weight cyclohexanol and
30 parts by weight of 30% acetic acid and the resultant solution is added to 500 parts by weight of crystal gum (gum arabic as thickening agent). Finally, 30 parts by weight of a zinc nitrate solution are added. The print obtained is dried, steamed for 30 minutes and subsequently rinsed. A yellowish red print of very good fastness properties is obtained.

EXAMPLE 20

Acid-modified polyglycol terephthalate fibres are introduced at 20° C. in a liquor ratio of 1:40 into an aqueous bath which contains, per litre, 3 to 10 g. sodium sulphate, 0.1 to 1 g. oleyl polyglycol ether (50 mol ethylene oxide), 0–15 g. dimethylbenzyl-dodecylammonium chloride and 0.15 g. of the dyestuff of the formula

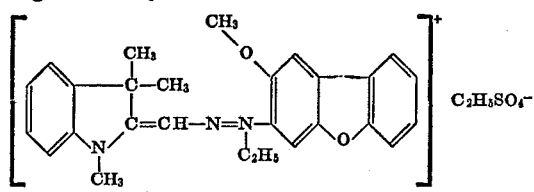

and has been adjusted with acetic acid to pH 4 to 5. The bath is heated to 100° C. within 30 minutes and kept at the same temperature for 60 minutes. The fibres are subsequently rinsed and dried. A yellowish red dyeing of very good fastness properties is obtained.

What is claimed is:

1. Hydrazone dyestuff of the formula

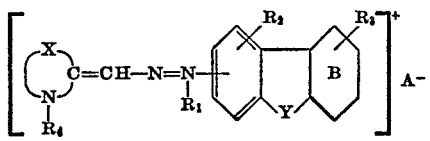

wherein
B is phenyl, tetrahydrophenyl or hexahydrophenyl;

is dihydroindoyl, pyrimidonyl, dihydropyrimidonyl, benzothiazolyl, dihydroquinoxalyl, dihydroquinoxalonyl, or dihydroquinazolyl;
Y is

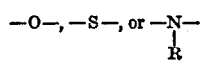

where R is hydrogen, lower alkyl, 2-chloroethyl, 3-chloropropyl, benzyl, β-phenylethyl, γ-phenylpropyl, phenylpropyl-(2,2), 4-nitrobenzyl, phenyl, lower alkylphenyl, chlorophenyl, or 4-aminophenyl;
R₁ is lower alkyl, 2-chloroethyl, 3-chloropropyl, lower alkenyl, benzyl, β - phenylethyl, γ - phenylpropyl, phenylpropyl-(2,2), 4-nitrobenzyl, ethoxyethyl, or ethoxycarbonyl-methyl;
R₂ is hydrogen, fluoro, chloro, bromo, lower alkoxy, lower alkyl, 2-chloroethyl, 3-chloropropyl, hydroxy, dimethylamino, diethylamino, di-n-propylamino, or lower alkanoylamino;
R₃, when ring B is phenyl, is hydrogen, chloro, bromo, lower alkyl, 2-chloroethyl, 3-chloropropyl, lower alkoxy, hydroxy, dimethylamino, diethylamino, di-n-propylamino, or lower alkanoylamino;
R₃, when ring B is tetrahydrophenyl, or hexahydrophenyl, is hydrogen, chloro, or lower alkyl;
R₄ is lower alkyl, 2-chloroethyl, 3-chloropropyl, cyclohexyl, 4 - methylcyclohexyl, benzyl, β - phenylethyl, γ-phenylpropyl, phenylpropyl-(2,2), 4-nitrobenzyl, phenyl, lower alkylphenyl, chlorophenyl, or bromophenyl; and
A⁻ is an anion.

2. The dyestuff of claim 1 of the formula

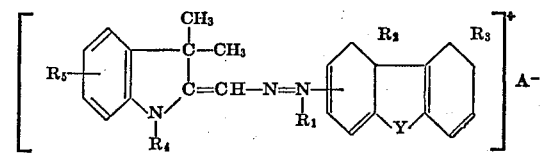

wherein
R₁, R₂, R₃ R₄, A⁻ are as defined in claim 1; and
R₅ is hydrogen, fluoro, chloro, lower alkyl, lower fluoro alkyl, lower alkoxy, lower carboalkoxy, nitro, cyano, or acetamino.

3. Hydrazone dyestuff according to claim 1 in which Y stands for

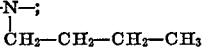

or

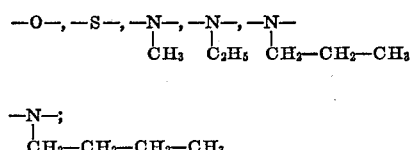

R₁ stands for methyl or ethyl;
R₂ stands for hydrogen, chlorine, methyl or methoxy;
R₃ stands for hydrogen, chlorine, methyl or methoxy;
R₄ stands for methyl or ethyl; and
R₅ stands for hydrogen, cyano, chlorine, methyl, ethyl, trifluoromethyl, nitro, methoxy, carbomethoxy or carboethoxy.

4. Hydrazone dyestuff of claim 1 of the formula

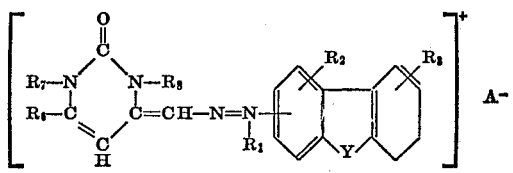

in which
R₁, R₂, and R₃ are as defined in claim 1;
R₆ stands for hydrogen or lower alkyl;
R₇ stands for lower alkyl;
R₈ stands for lower alkyl; and
A⁻ stands for an anion.

5. Hydrazone dyestuff according to claim 4 in which Y stands for

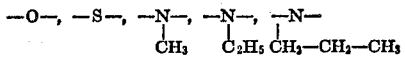

or

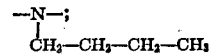

R₁ stands for methyl or ethyl;
R₂ stands for hydrogen, chlorine, methyl or methoxy;
R₃ stands for hydrogen, methyl or methoxy;
R₆ stands for methyl, ethyl or phenyl;
R₇ stands for methyl or ethyl; and
R₈ stands for methyl or ethyl.

6. Hydrazone dyestuff according to claim 1, in which R₁ stands for the methyl group.

7. Hydrazone dyestuff according to claim 1, characterised in that A⁻ represents the formate, acetate, malonate, maleate, succinate, adipate or lactate anion.

8. A dyestuff of the formula

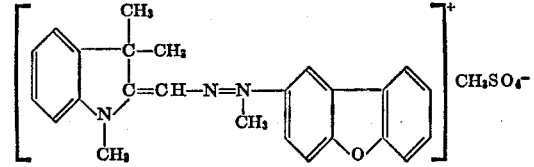

9. A dyestuff of the formula

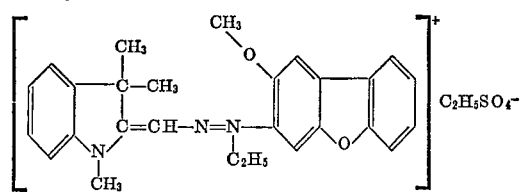

10. A dyestuff of the formula

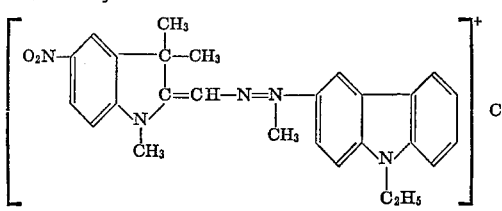

11. A dyestuff of the formula

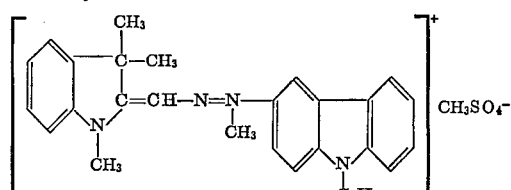

12. A dyestuff of the formula

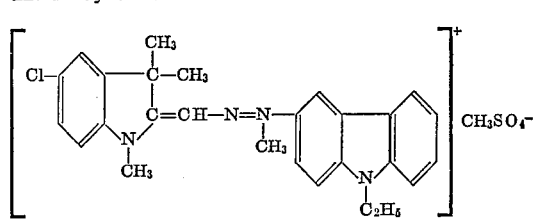

13. A dyestuff of the formula

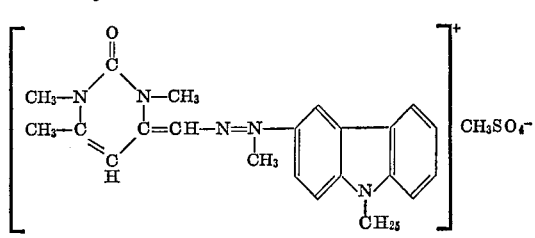

14. A dyestuff of the formula

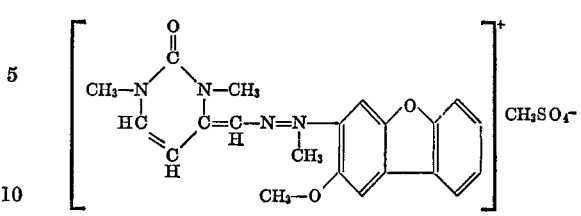

15. A dyestuff of the formula

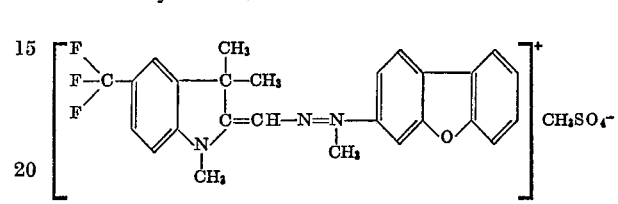

16. A dyestuff of the formula

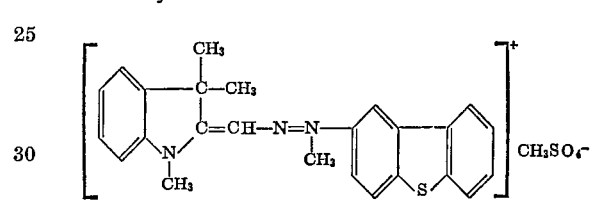

References Cited
UNITED STATES PATENTS

| | | | |
|---|---|---|---|
| 2,815,338 | 12/1957 | Ruegg | 260—152 |
| 3,314,934 | 4/1967 | Leuchs | 260—158 |
| 3,331,831 | 7/1967 | Raub et al. | 260—162 |
| 3,347,844 | 10/1967 | Rhyner et al. | 260—165 |
| 3,154,555 | 10/1964 | Dehnert | 260—155 X |
| 3,345,355 | 10/1967 | Raue | 260—165 |
| 3,562,245 | 2/1971 | Mohr et al. | 260—146 R |
| 3,635,942 | 1/1972 | Mohr et al. | 260—157 |

FLOYD D. HIGEL, Primary Examiner

U.S. Cl. X.R.

260—154, 158, 165, 251 R, 268 BC, 315, 326.11, 329 AM, 346.2 M